United States Patent [19]
Neuenschwander

[11] 3,838,596
[45] Oct. 1, 1974

[54] METHOD AND APPARATUS FOR CONTINUOUSLY TESTING SAMPLES OF SHEET MATERIAL

[75] Inventor: Rudolf Neuenschwander, Swarthmore, Pa.

[73] Assignee: Scott Paper Company, Delaware County, Pa.

[22] Filed: Nov. 17, 1972

[21] Appl. No.: 307,349

[52] U.S. Cl. .............................................. 73/95.5
[51] Int. Cl. ............................................ G01n 3/10
[58] Field of Search...... 73/95, 95.5, 90, 93, 388 BN

[56] References Cited
UNITED STATES PATENTS

| | | | |
|---|---|---|---|
| 2,212,085 | 8/1940 | Tate | 73/90 |
| 3,091,960 | 6/1963 | Honda, Jr. | 73/95 |
| 3,504,536 | 4/1970 | Baker et al. | 73/95 |

Primary Examiner—Jerry W. Myracle
Attorney, Agent, or Firm—William J. Foley

[57] ABSTRACT

Disclosed is a method and apparatus for automatically and continuously testing successive samples of sheet material by performing the functions of: automatically feeding a continuous length of the sheet material, such as paper, into cutting means where successive samples are automatically cut to the desired size; automatically transferring each cut sample from the cutting means to one of a plurality of testing units mounted on a continuously rotating turret assembly; applying a gradually increasing tensile force to each sample until the sample fails; and sensing the amount of tensile force required to fail the sample and the amount of stretch resulting in the sample at failure through stationary scanning means positioned to sense the measurements on each testing unit as it revolves past at a time after the sample has failed. The cutting station has the capability of automatically cutting the samples in different directions with respect to the length of material to permit testing the material in various directions such as machine direction or cross-machine direction. The scanner means has the capability of producing a transmittable signal indicative of the measured tensile force and stretch of each sample. The transmittable signal can be converted by conventional equipment to a form which permits recording the measurements. The apparatus is capable of subjecting a plurality of samples to tensile force at the same time, each being held by a separate testing unit. Thus, the number of samples being tested per unit time is not limited by the maximum tensile force application rate of a single sample.

38 Claims, 14 Drawing Figures

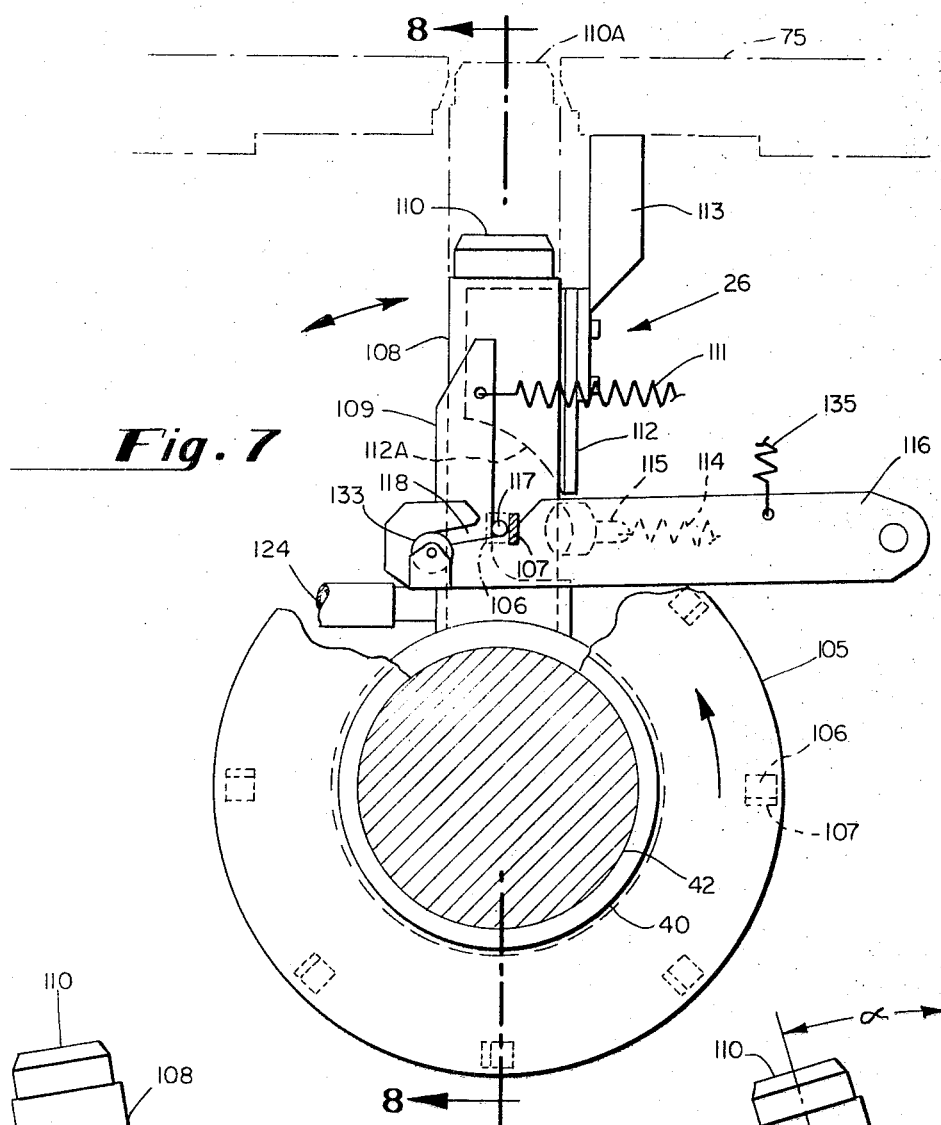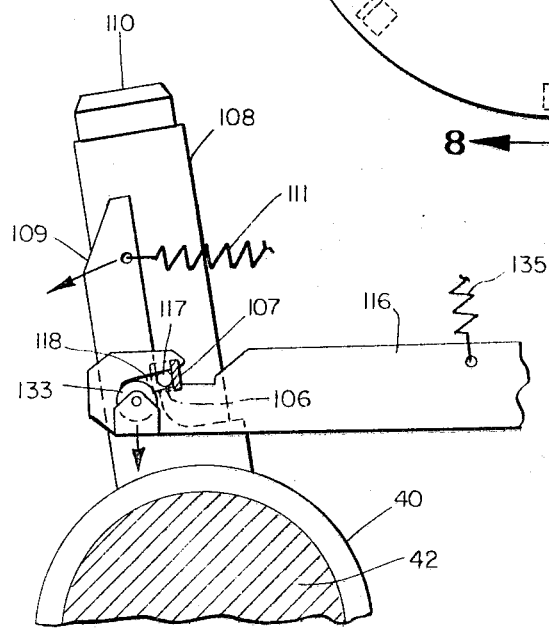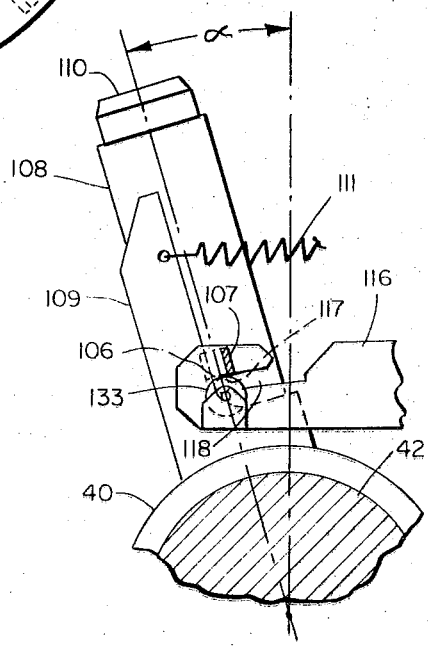

METHOD AND APPARATUS FOR CONTINUOUSLY TESTING SAMPLES OF SHEET MATERIAL

BACKGROUND OF THE INVENTION

1. Field of the Invention

The invention relates to a testing apparatus for automatically determining the tensile strength of sheet materials and the resulting stretch in the sheet material upon failure. The invention is particularly applicable to testing paper products.

2. Description of the Prior Art

In many industries producing sheet-like products, quality controls on the products produced require various tests on the products, in either their intermediate or finished stage, to determine certain physical properties. In the paper industry, one such test is a measure of the paper's tensile strength and the stretch resulting in the sheet when it is subjected to tensile forces. In the past, tensile testing of paper products has been accomplished by hand cutting samples of the paper to be tested to a standard sample size, usually one inch by four inches long, and individually placing each sample by hand in the jaws of two spaced apart chucks. Tensile force was then applied to the sample until the sample failed and the amount of force required to fail the sample was recorded. The amount of movement of the sample jaws up to the point of failure was often recorded also to indicate the stretch resulting in the sample.

This prior art method has two basic disadvantages. The first is that only one sample can be tested at a time and a large number of samples to be tested required a substantial period of time. It is well known that accurate tensile testing of paper products requires that the tensile force be applied at a gradually increasing rate and that a minimum amount of time is required to apply the required tensile force to each sample (10 to 15 seconds, for example). There is also a certain amount of time involved in inserting each sample within the chuck jaws and removing the broken samples from the chuck jaws.

The second disadvantage to the system is that it introduces human errors into the testing which results in inaccuracies. For example, accurate testing requires that each sample be placed carefully in an aligned position within the chuck jaws. But such alignment is not likely when the samples are placed in the chucks by the hands of a technician. Furthermore, it is important that all samples be cut exactly the same size in order to give accurate measurements. Hand cutting by a technician introduces errors in this aspect also.

In measuring paper products, such as sanitary paper products, the tensile and stretch results of each sample, even when the samples are all taken from a single source, have been found to vary from each other significantly. Meaningful measurements, therefore, require that a number of samples be measured and averaged. But the prior art systems are quite slow, leading to the tendency to test the production of a papermaking machine at infrequent intervals. However, operating factors in papermaking equipment vary periodically, changing the properties of the paper produced. Because of the customary long time lapse between testing samples from each group of paper taken from the machine, a papermaking machine might produce undesirable quality paper for a long period of time before test results inform the papermaking machine operator that his machine is produced off-spec. paper. It has, therefore, long been recognized that a machine for quickly and accurately testing samples of paper could be a most useful tool in maintaining high quality standards of production.

Accordingly, it is an object of this invention to design an apparatus capable of testing samples of paper products at a much higher rate than prior art apparatus. It is also an object of the invention to design an apparatus capable of testing paper products with as little introduction of human error as possible, in order to increase the accuracy of the testing procedure.

SUMMARY OF THE INVENTION

The apparatus and method of the invention satisfy the objects of the invention by automatically cutting samples of the paper to be tested from a continuous length of the paper, placing each cut sample in the jaws of a testing unit which subjects the sample to a gradually increasing tensile force until the sample fails, and measuring the tensile force required to fail the sample and the stretch resulting in the sample at failure. The apparatus includes a plurality of testing units mounted on a turret assembly for continuous rotation with the turret assembly. Each testing unit passes sample transfer means where a cut sample is placed in the sample-gripping jaws of the testing unit. The testing unit then passes a scanner means where the amount of tensile force and stretch to which the sample was subjected can be measured. While revolving from the transfer means to the scanner means, each testing unit gradually applies an increasing tensile force to the sample it is holding. The rate of tensile force application is adjusted to assure that the sample fails before its testing unit passes the scanner means. Each testing unit includes measuring means which temporarily maintain measurements of the amount of force and stretch to which the sample is subjected. These measurements are maintained until the measuring means has been scanned by the scanning means. Thus, the samples can fail anywhere between the transfer means and the scanning means and the measurements can all be scanned at a single fixed location by a single scanning device.

A number of samples can be subjected to tensile force at the same time, and therefore, the number of samples being tested per unit time is not limited to the amount of time required to fail one sample. To illustrate, the number of testing units can be chosen so as to be testing 10 samples at the same time with the rate of tensile-force application adjusted to fail the sample in 15 seconds, and the apparatus will be capable of testing approximately 30 samples per minute. This rate compares favorably with prior art systems which are generally limited to testing a maximum of approximately two to four samples per minute.

The cutting means of the apparatus includes a cutting assembly mounted for rotation about an axis perpendicular to the plane of the material placed in the cutting means. The cutting assembly can be automatically rotated to enable the cutting of samples in the machine direction of the paper or the cross-machine direction of the paper. The cutting means includes a punch and die in the shape of the samples to be cut. The cutting means further includes stationary press means for applying cutting force to the punch.

The sample transfer means includes a transfer plate which is movable into the die cavity to pick up each cut sample, holding means for holding each sample to the transfer plate during transfer, and first moving means for transferring each cut sample from the cutting means to the path of the continuously revolving testing units. Second moving means are included to enable the transfer plate and sample to be moved along the path of the testing units for a short distance with the sample-gripping jaws to allow the sample-gripping jaws of each testing unit to grip the sample. Return means return the transfer plate back to the cutting means after transfer of the sample to the sample-gripping jaws. The sample transfer means further includes turning means for rotating the transfer plate as it moves into or from the cutting die to align the sample with the gripping jaws and to align the transfer plate with the cutting die, regardless of the disposition of the cutting die, it being mentioned earlier that the cutting die is rotatable into different dispositions.

The apparatus further includes a separation plate, made of magnetically attractable material, disposed within the punch. Upon withdrawal of the transfer plate from the die cavity, magnets within the transfer plate pull the separation plate downward for a short distance. The cut sample, sandwiched between the separation plate and the transfer plate, is broken free of the cutting die edges and assured of being carried with the transfer plate. Stop means prevent the separation plate from following the transfer plate more than a short distance. Upon being separated from the transfer plate, the separation plate is returned into the punch by spring means.

Each testing unit includes a pair of sample-gripping jaws. One is securely held to prevent movement in the direction of the applied tensile force. The other sample-gripping jaw is movable in the direction of the applied tensile force and is connected to a piston within a cylinder. Tensile force is applied to the sample by increasing the air pressure within the cylinder. Air is supplied from a constant pressure source through a conduit to the cylinder. Air is constantly bled from the conduit out through a nozzle into a small air gap between the nozzle and a backup plate. The size of the air gap controls the back pressure within the conduit and the cylinder, and thus, the amount of tensile force applied to the sample.

The nozzle is contained in a floating housing to which one end of an iso-elastic spring is attached for urging the housing away from the sample. When the spring is expanded a forward force is applied through the spring to the floating housing, reducing the size of the air gap and increasing the pressure within the cylinder. The end of the cylinder opposite the piston receives a reaction force equal to that force applied to the piston. The reaction force urges the floating housing away from the air gap backup plate, increasing the size of the air gap and decreasing the pressure within the cylinder. The floating housing is forced away from the air gap backup plate until the reactionary force against the end of the cylinder equals the forward force on the floating housing by the expanded spring. Because the amount of force applied to the floating housing by the iso-elastic spring is directly proportional to the expansion of the spring, the amount of tensile force applied to the sample can be and is controlled by controlling the amount of expansion of the spring. Attached to the other end of the spring is a cam-driven member for causing expansion of the spring.

Each of the testing units is mounted on the outside periphery of a rotatable turret cylinder which is continuously rotated along with the rest of the turret assembly during operation of the testing unit. Within the turret cylinder is a stationary cylindrical housing having a cam surface on one end. The cam-driven members of each testing unit extend into the turret cylinder and are biased against the cam surface of the cylindrical housing. As the testing units revolve, the cam surface of the cylindrical housing moves the cam-driven members of each testing unit forward in a direction parallel to the axis of the turret rotation. The amount of movement of the cam-driven members, and consequently the rate of increase in tensile force on the sample, is controlled by the slope of the cam surface.

Within the stationary cylindrical housing are two cylindrically disposed spaces or slots concentric with each other, and each containing a generally cylindrically shaped sheet cam. Each of the sheet cams is pivotally attached at one end to the cylindrical housing and includes means to extend or retract the other end of the sheet cam in a direction parallel with the axis of the cylindrical housing. Extension or retraction of either sheet cam will change the slope of the cam presented to the cam-driven menbers of each testing unit. Thus, the amount of tensile force to be applied to any given sample can be readily adjusted by adjusting the sheet cam.

A further advantage is gained by extending the cam followers of the cam-driven members of alternate testing units further toward the center of the turret cylinder to cause those cam followers to be in operative contact with the inner-sheet cam and extending the cam followers of the other testing units only far enough to be in contact with the outer sheet cam. Because each of the two sheet cams can be adjusted to have a different slope from the other, the amount of tensile force applied to alternate samples will be different. The ability to apply different tensile forces will be different. The ability to apply different tensile forces to different samples is particularly advantageous when testing paper products where every other sample is cut in alternating machine direction and cross-machine direction. The amount of tensile force required for breaking the samples taken in the cross-machine direction is generally much less than the amount of tensile force required to break the samples taken in the machine direction.

Attached to the cam-driven member in each testing unit is a force-measuring rod with an electrically conductive element disposed on one end. The electrically conductive element is extended to the same extent as a cam-driven member is extended by the cam surface. Thus, because the tensile force applied to the sample is directly proportional to the movement of the cam-driven member, the amount of extension of the electrically conductive element is directly proportional to the amount of tensile force applied to the sample, also. Scanner means measure the extension of the electrically conductive element.

A stretch-measuring rod is attached to the piston on the side opposite the gripping jaws and is movable with the gripping jaws. At the other end of the stretch-measuring rod is an electrically conductive element which extends in response to and to the same degree that the sample stretches when being subjected to the tensile force. Scanner means also measure the extension of this electrically conductive element.

Within each testing unit are locking means to hold both the force-measuring rod and the stretch-measuring rod in the extended positions they reached at the time of sample failure. Thus, regardless of when the sample fails, the positions of the electrically conductive elements can be measured when the elements revolve past a single stationary point sometime after the sample has failed. The scanner is located at this point and it senses the amount of tensile force and stretch each sample was subjected to at the time of its failure.

The scanner includes an electrically conductive element which is movable along a line which passes through the path of the electrically conductive elements. The scanner also includes a fixed electrically conductive element which forms a reference point through which the movable electrically conductive element also passes in moving along the line. Within the scanner there is means for producing a transmittable signal, such as electrical, optical, magnetic or pneumatic, having a quantitative value directly proportional to the amount of movement of the electrical contact in the scanner along the line. Upon contact of the electrically conductive element of the scanner with one of the measuring elements, electrical switch means activate the signal transmitting means. Upon contact of the electrically conductive element of the scanner with the reference point conductive element, electrical switch means terminate the transmission of the signal. The length of the signal transmitted can be converted by conventional electronic equipment to a digital form which is indicative of either the amount of tensile force applied to the sample or the amount of stretch resulting in the sample, depending upon which element was measured. Of course, the operation of the switch means can be reversed, it only being necessary to quantitatively relate the length of the signal to the position of the measuring elements with respect to the reference point. A preferred form of the scanner apparatus includes an external helix having a uniform slope and being rotatable at a uniform speed.

BRIEF DESCRIPTION OF THE DRAWINGS

FIG. 7 is a front elevation view of the sample transfer means.

FIGS. 9 and 10 are partial front elevation views of the sample transfer means, illustrating the movement of the transfer plate along with the sample-gripping jaws.

DESCRIPTION OF THE PREFERRED EMBODIMENT

Figure 1:
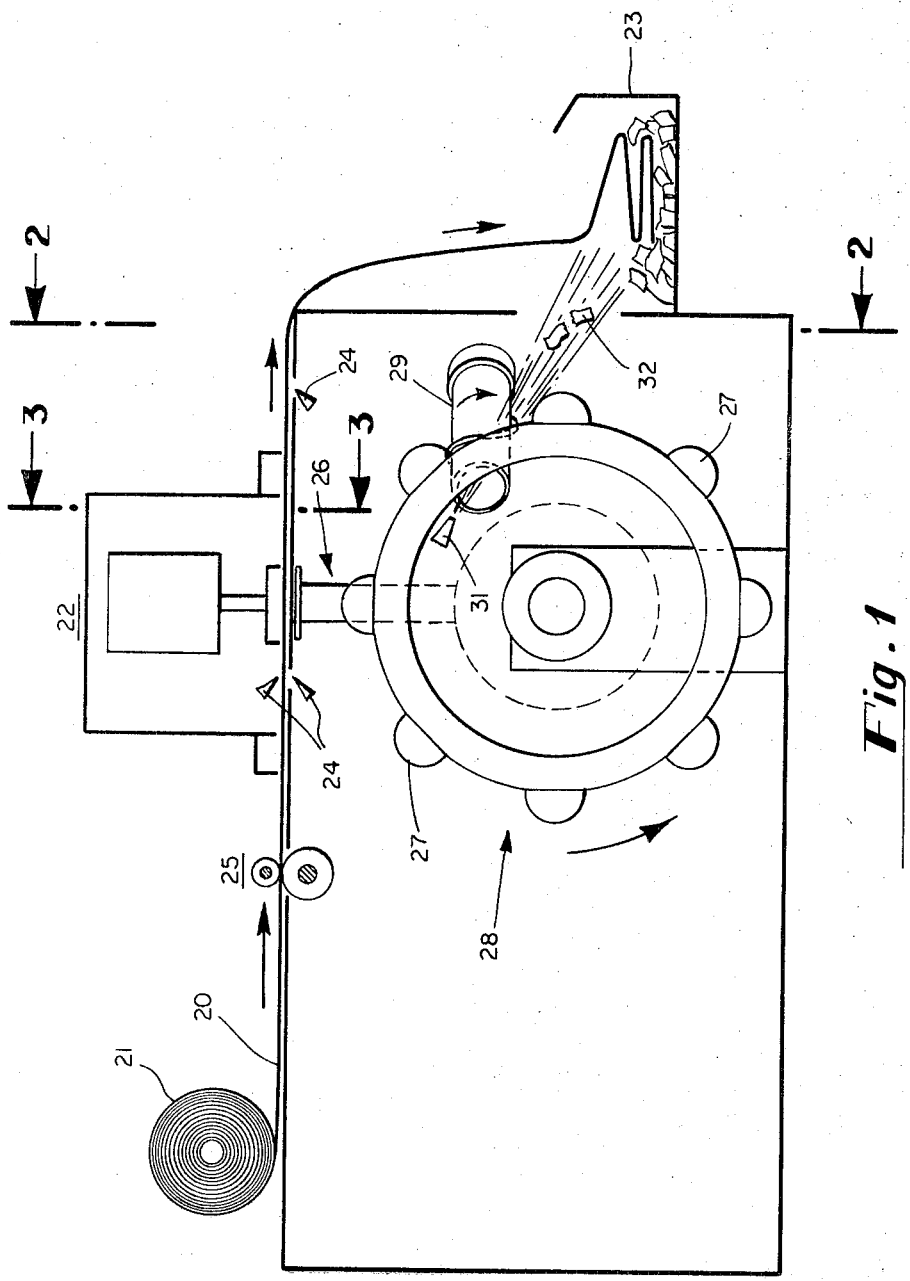
FIG. 1 is a front elevation view in schematic form of the automatic tensile testing apparatus of the invention.

The preferred embodiment of the apparatus, illustrated schematically in FIG. 1, includes four basic operation means: sample cutting means 22; sample transfer means 26; sample testing means represented by a rotatable turret assembly 28 containing a plurality of sample testing units 27; and test result read-out means provided by scanner 29. The apparatus is operated by feeding a continuous lengthh of sample paper 20, which may be unwound from a roll 21, into the cutting means 22 where the appropriate size samples are cut for testing. The continuous length of sample paper 20 is advanced into the cutting means 22 by air intermittedly blown from air nozzles 24. The paper 20 is passed through a nip formed by indexing rolls 25 prior to entering the cutting means 22. The indexing rolls 25 are rotated a predetermined incremental distance each time the paper is advanced. By controlling the amount of rotation of the indexing rolls 25, the spacing along the continuous length of paper 20 between locations where successive samples are cut can be controlled. The width of the continuous length of paper 20 is preferably greater than the desired sample size so that after cutting samples from the length, a continuous web still exists which can be advanced out of the cutting means by air blown from air nozzle 24 and into the waste basket 23 for collection.

After each sample of paper is cut in the cutting means 22, the sample transfer means 26 conveys it to the path of the continuously revolving sample testing units 27. The sample transfer menas 26 is adapted to move the sample for a short distance along the path of sample testing unit 27 movement and at the same speed of the sample testing unit 27. While the sample is being moved along with the sample testing unit 27, it is taken from the sample transfer means 26 by sample-gripping jaws of the sample testing unit 27.

As each sample is carried by a sample testing unit 27, it is subjected to a gradually increasing tensile force by the testing unit 27. The rate at which the tensile force is applied to the sample is adjusted to cause the sample to fail before it revolves past the scanner 29. Within each sample testing unit 27 are elements which measure the amount of tensile force applied to the sample and the amount of resulting stretch in the sample. Upon failure of the sample, these measuring elements are locked in position to temporarily hold these measurements. The scanner 29 reads these measurements as each sample testing unit 27 revolves past the scanner 29. The scanner 29 includes means to convert the read measurements into a transmittable signal which can be converted to a useful form such as a digital readout, a computer input, etc. After passing the scanner, the broken sample 32 is blown into the waste basket 23 by air nozzle 31.

At any given time in the operation of the apparatus, a plurality of samples are in some stage of being tested. For example, while a sample is being transferred to the uppermost sample testing unit 27, a number of samples are undergoing varying degrees of tensile stress in other sample testing unit 27, and at the same time the scanner 29 is reading the measured values from another sample testing unit 27 in which the sample has been broken. In this manner, the number of samples tested in any given period of time can be greatly increased.

Figure 2:
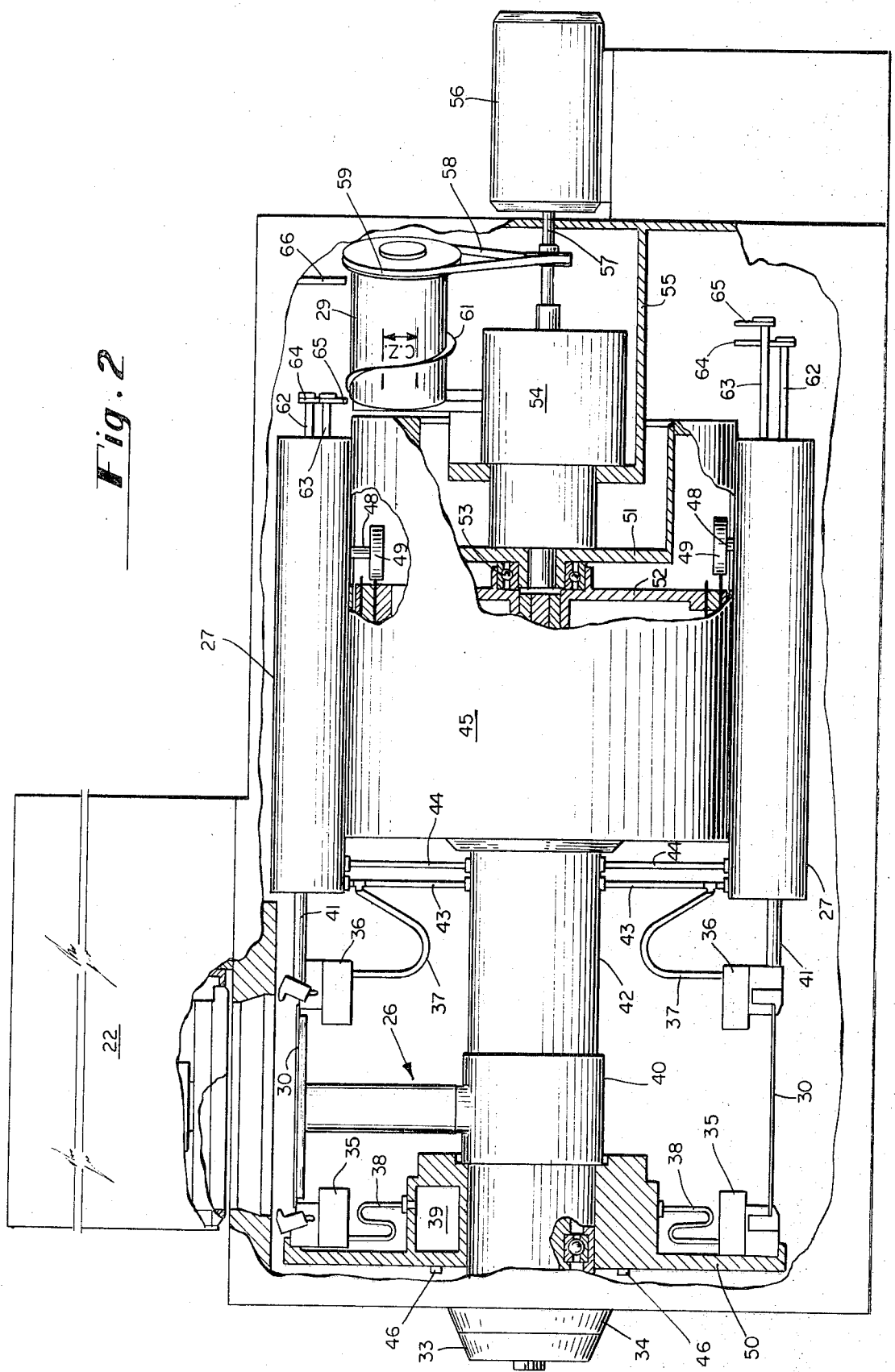
FIG. 2 is an elevation view of the apparatus taken along line 2—2 in FIG. 1, with portions broken out for illustration purposes.

FIG. 2 further illustrates the preferred embodiment of the apparatus. In that figure, the sample testing means is more clearly illustrated as consisting of a plurality of sample testing units 27 mounted on the outer periphery of rotatable turret cylinder 45. The turret cylinder 45, along with its connecting turret shaft 42, are continuously rotated by drive motor 56, acting through motor drive shaft 57, turret-drive gear box 54, and turret-assembly drive member 51. Illustrated within the broken out section in FIG. 2 is a portion of the sheet-cam housing 52, the operation of which will be explained subsequently. The sheet-cam housing 52 is stationarily mounted and communicates with the turret-assembly drive member 51 through ball bearings 53.

Stationarily positioned toward the outer periphery and at one end of the turret cylinder 45 is the scanner 29. The scanner 29 is continuously rotated by the drive motor 56 acting through a scanner drive chain 58 which transmits motion from the motor drive shaft 57 to the scanner drive sprocket 59. The scanner 29 is adapted to measure the amount of extension of the elements 64 and 65 of the sample pull station 27 as it revolves past the scanner 29.

Rigidly attached to the front end of the turret shaft 42 is a gripping-jaw holding plate 50. Fixed sample-gripping jaws 35 are mounted to the gripping-jaw holding plate 50 for rotation therewith. The jaws of the fixed sample-gripping jaw 35 are opened or closed when each fixed sample-gripping jaw 35 revolves past predetermined locations. The opening and closing of the jaw is activated through air operating means. Air is supplied through hoses 38 from air valves 39. Operation of the air valves 39 is controlled by contact of air valve controllers 46 with a stationary cam (not shown) in a manner well known in the art.

Immediately opposite each fixed sample-gripping jaw 35 is a movable sample-gripping jaw 36 connected to a sample testing unit 27 through piston rod 41. Tensile force is applied to the sample 30 through piston rod 41 by force actuation means within the sample testing unit 27, to be described subsequently. In like manner to fixed sample-gripping jaw 35, the jaws of the movable sample-gripping jaws 36 are opened and closed through air acuating means. Air is supplied through hoses 43 and 37 from a conduit (not shown) within the turret shaft 42 which conducts air from air valves 39.

Referring now to FIGS. 3, 4, 5 and 6 the cutting means 22 is illustrated as generally consisting of punch 99 and die 77 and punch operative means provided by air piston 72. The air piston 72, mounted to the cutting means frame 96, converts a neumatic pressure supplied through air hose 97 to a mechanical pressure applied through air piston shaft 86 to the punch arm 85 through the punch arm connecting pin 87. The punch arm 85 pivots about punch arm pivot pin 88 connected at a spaced location from the air piston 72 to cutting means frame 96. The mechanical force applied to punch arm 85 is transmitted to the punch 99 through punch force-transfer rod 92 which is connected to the punch arm 85 through an upper ball joint 89 and to the punch 99 through a lower ball joint 91.

Punch 99 is rigidly attached to punch base plate 93 which is assured of precise vertical movement by the attached punch guideshafts 83, vertically movable in guide bearing housings 82. Attached to the punch base plate 93 through spring-biased guide rods 94 is a sample paper hold-down plate 84. The initial downward movement of the punch 99 places the sample paper holddown plate 84 firmly against the length of sample paper 20 to hold it against rotatable base plate 75. Further movement of the punch 99 closes the space between the punch base plate 93 and the sample paper hold-down plate 84 by compressing the springs around the spring-biased guide rods 94.

Beneath the punch is a rotatable base plate 75 containing a die cutting-edge insert 78. The rotatable base plate 75 is rigidly attached through punch and die assembly frame 74 to the punch assembly 80 consisting of the guide bearing housings 82, the punch base plate 93, the punch 99, and the sample paper holddown plate 84. The punch and die assembly is connected through a rotatable shaft 73 to a cutting means rotation motor 71 mounted to the cutting means frame 96. The cutting means rotation motor 71 can be provided by either an air operated motor or an electric motor which is capable of rotating a shaft back and forth through 90°. The cutting means rotation assembly is actuated at predetermined periods by conventional switch means. This arrangement permits the entire punch and die assembly to be rotated horizontally through 90°, enabling samples 30 (illustrated in FIG. 2) to be cut in different directions on the continuous length of sample material 20. For example, referring to FIG. 5, if the elongate dimension of the die is aligned in the long dimension of the continuous length of the sample material 20, the samples will be cut in the long direction of the paper (which is generally the machine direction). Machine direction cut-out 98 in the sample material 20 illustrates where such a sample was cut. By rotation of the punch and die assembly through 90°, the elongate dimension of the die is aligned perpendicularly to the long dimension of the continuous length of sample material 20 (which is generally the crossmachine direction). The die cutting-edge insert in such a position is illustrated in dotted lines and indicated with the numeral 78A. Cross-machine direction cutout 100 illustrates where such a sample was cut.

Figure 6:
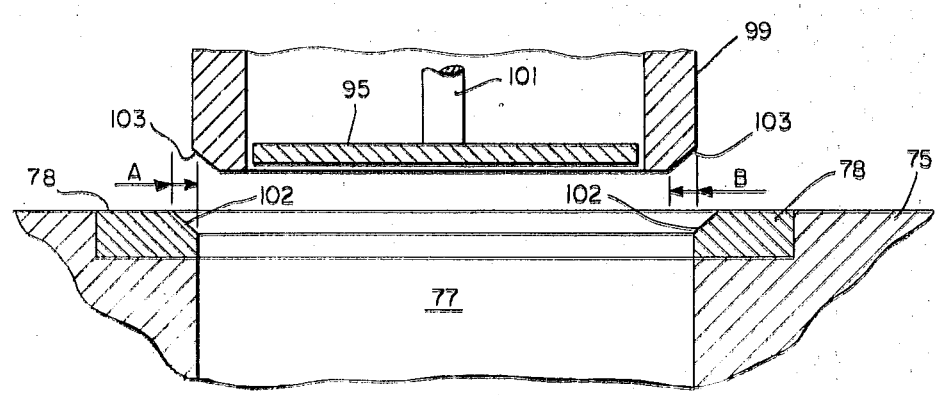
FIG. 6 is a cut-away elevation view of the punch and die of the cutting means.
Figure 4:
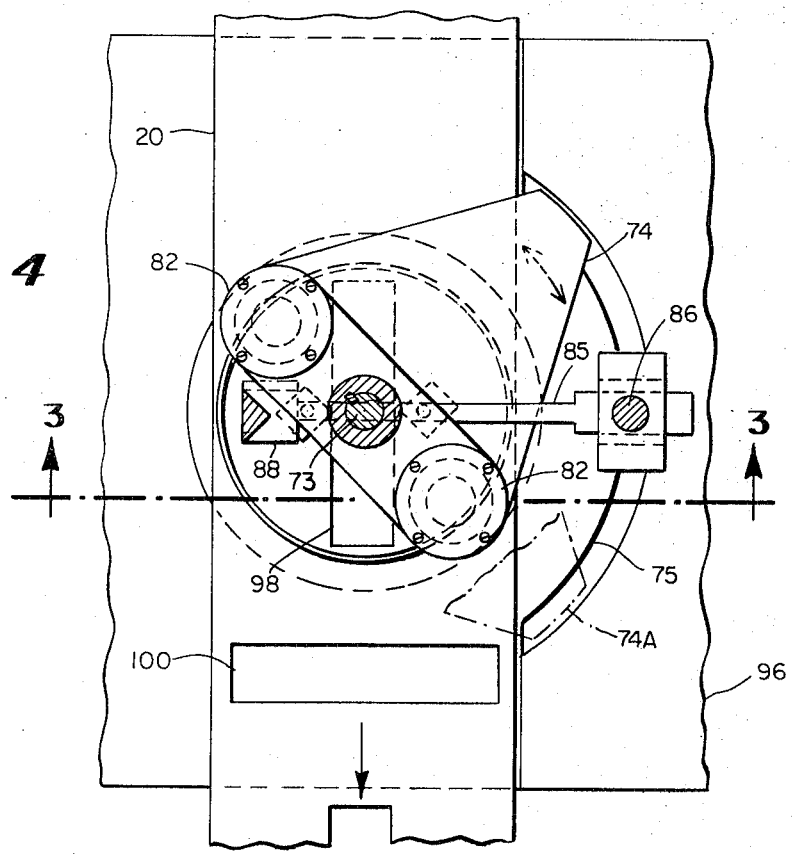
FIG. 4 is a cut-away plan view of the cutting means taken along line 4—4 in FIG. 3.
Figure 5:
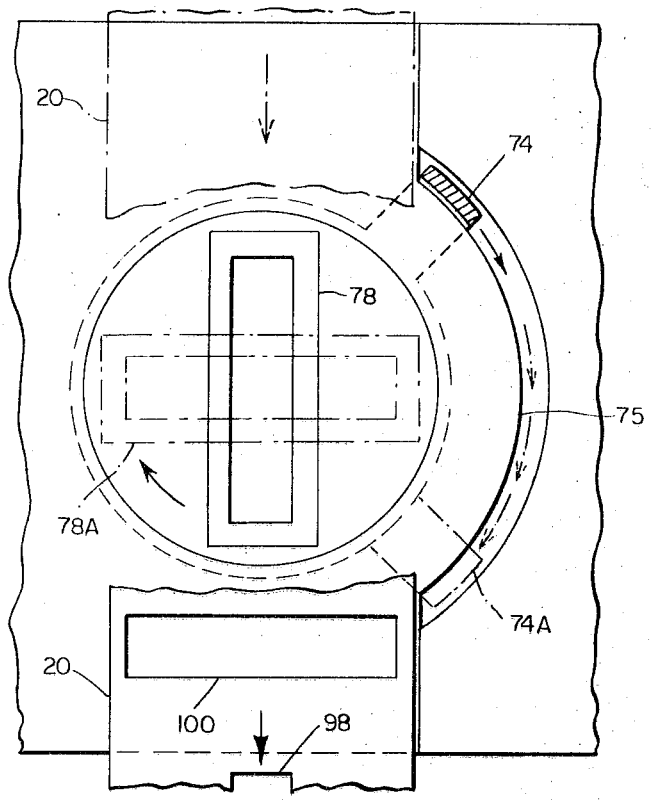
FIG. 5 is a cut-away plan view of the cutting means taken along line 5—5 in FIG. 3.

The preferred form of punch and die are illustrated in FIG. 6, where the cutting edge 103 of the punch 99 and the cutting edge 102 of the die cutting-edge insert 78 are chamfered. The chamfering provides self centering insertion of the punch 99 into the die cavity 77 without undue wear upon the cutting edges 102 and 103. The width of the chamfer on the cutting edge 102, designated by the letter A, and the width of the chamfer on the cutting edge 103 designated by the letter B, must be no greater than the thickness of the sample paper to be cut. Otherwise, the punch would depress the paper into the die cavity before cutting, and clean, well-defined samples would not be cut. On the other hand, without the chamfers, the alignment of the punch and die would have to be unreasonably precise, requiring very rigid guide assemblies, or the excessive wear on the cutting surfaces would shorten the life of the cutting surfaces to an unreasonably small time. The dimensional tolerances between the size of the punch and the die must of course be extremely small to enable cutting of such fibrous, flexible material as tissue paper. The angle of the chamfer is preferably 45°, but variation is permissable as long as the chamfer slopes are parallel to each other.

Figure 8:
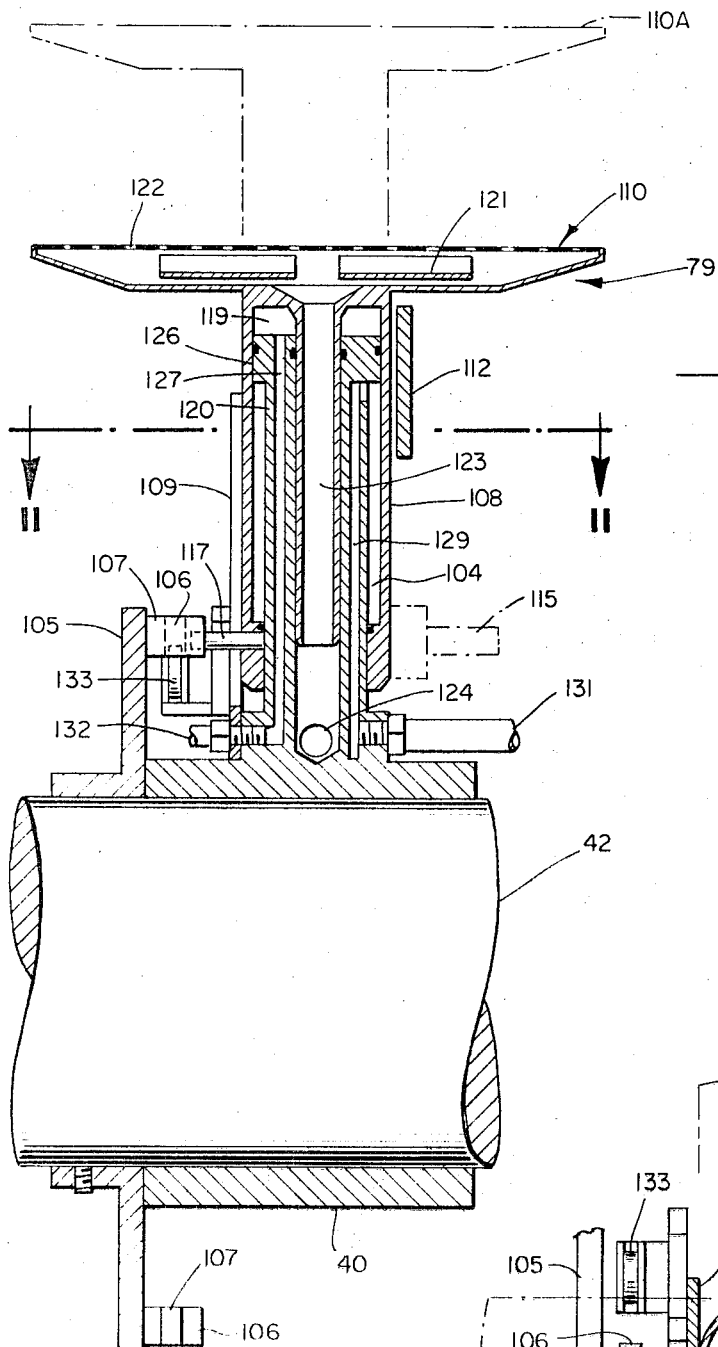
FIG. 8 is a side elevation view of the sample transfer means taken along line 8—8 in FIG. 7.
Figure 11:
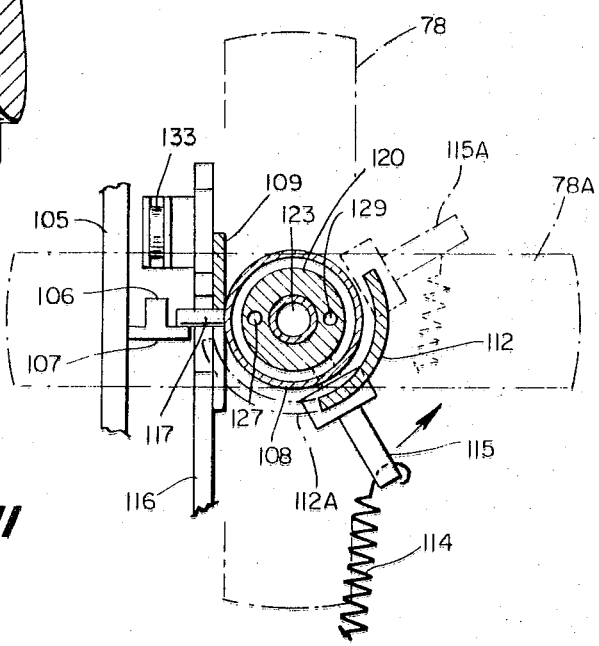
FIG. 11 is a sectional plan view of the sample transfer means taken along lines 11—11 in FIG. 8 and illustrating the means for turning the transfer plate.

FIG. 7, 8 and 11 illustrate the preferred embodiment of the sample transfer means 26. The function of the sample transfer means 26 is to convey the samples 30 from the cutting means 22 to the gripping jaws 35 and 36 of the sample testing units 27. To perform this function, the sample transfer means 26 includes sample transfer plate 79 which attaches to the sample in the die cavity 77 immediately upon being cut (see FIG. 3). The sample transfer plate 79, with its attached sample, is then withdrawn from the die cavity 77 and pulled down into the path of the moving gripping jaws 35 and 36. The sample transfer plate 79 is moved along with the gripping jaws for a short distance at the same speed. During this movement, the sample 30 is gripped by the sample gripping jaws 35 and 36 and taken from the sample transfer plate 79 which moves back to align itself with the die cavity 77 and then is extended back into the die cavity to collect the next sample.

Referring now to FIG. 8, the sample transfer plate 79 includes a sample gripping surface 110 which is generally the shape and size of the sample to be cut, but slightly shorter to allow enough overhang of the sample over both ends to permit gripping of the sample by the gripping jaws 35 and 36. The sample gripping surface 110 includes a plurality of suction air openings 122, which may be slots or other holes, through which a suction is applied to the sample to hold it to the gripping surface 110. The suction force is provided by evacuating air through the suction air passageway 123 and out through suction air supply hose 124 (illustrated as an opening in FIG. 8).

Figure 3:
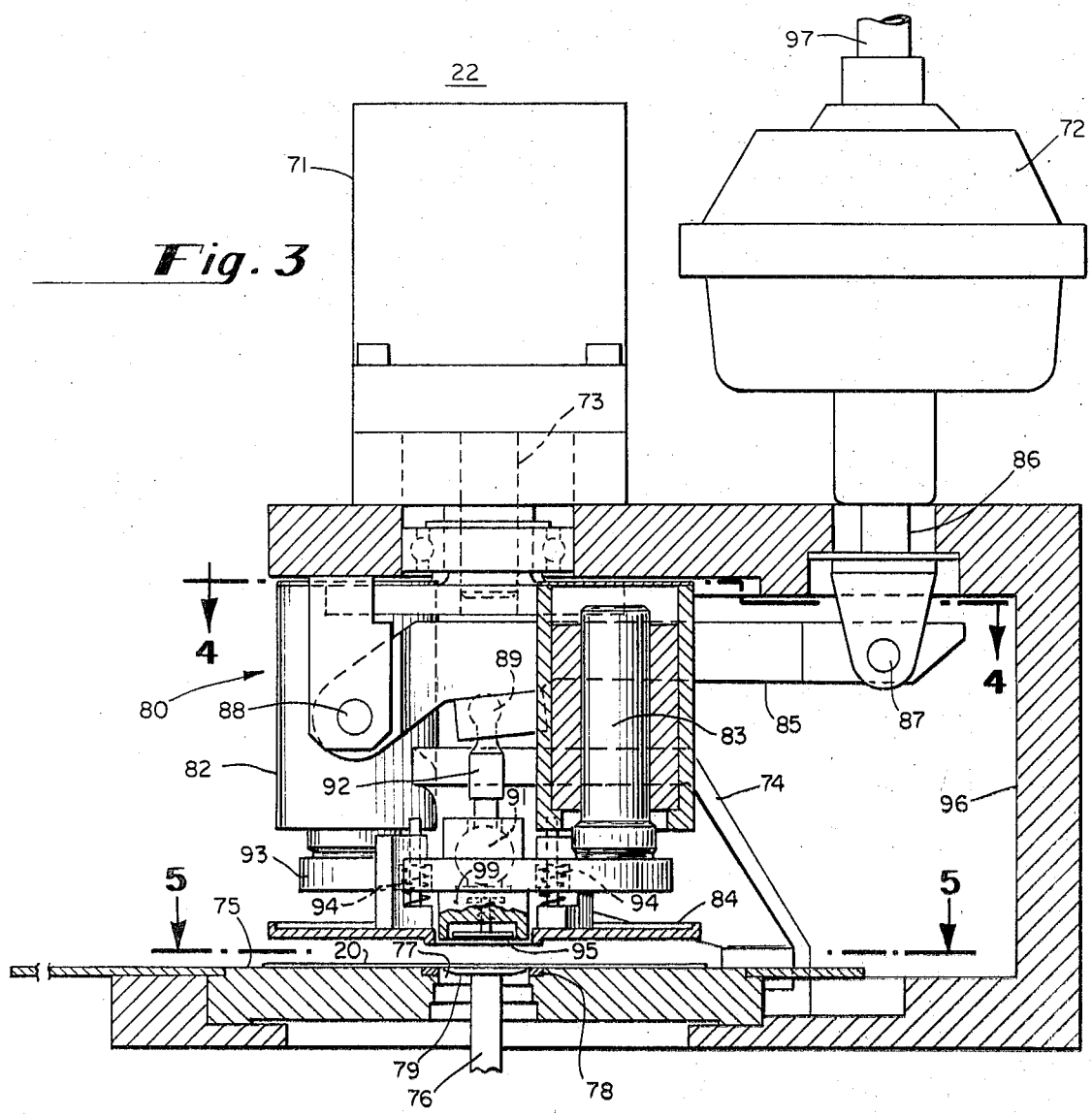
FIG. 3 is a side elevation view of the cutting means taken along line 3—3 in FIG. 1.

It has been discovered that there is an occasional tendency for cut samples of paper to stick to the cutting edges of the die 78 and not be pulled down by transfer plate 79. A unique arrangement is illustrated in FIG. 3 which assures that the cut samples will be pulled free of the die cutting edge 78. The arrangement consists of a separation plate 95 mounted within the punch 99 and slightly recessed to prevent interference with the cutting operation. The separation plate 95 is attached to the punch 99 through spring-biased separation guide-rods 101. The separation-plate guide-rods 101 are free to move downward within the punch 99, permitting the separation plate 95 to be pulled into the die cavity 77 for a short distance by the sample transfer plate 79.

The sample transfer plate 79 includes magnets 121 (see FIG. 8) which attract the separation plate 95, which must be made of magnetically attractable material, such as steel. The separation plate 95 is pulled against the sample gripping surface 110, securely sandwiching the sample between. When the sample transfer plate 79 is pulled down out of the die cavity 77, separation plate 95, being permitted to follow for a short distance, pushes the cut sample free of the die cutting edges 78.

A stop on the ends of the separation plate guide rods 101 prevents the separation plate 95 from following the sample transfer plate 79 further than a short distance. Sample transfer plate 79 continues conveying the sample downward, held by suction to the gripping surface 110 and moving the magnets 121 away from the separation plate 95. The relaxation of the magnetic force on the separation plate 95 permits the biasing springs about the separation plate guide rods 101 to return the separation plate 95 back into the punch 99.

The sample transfer plate 79 is attached to transfer cylinder 108 which is reciprocatable about transfer-cylinder piston 126. Above the transfer-cylinder piston 126 is a transfer-cylinder extension air-chamber 119. The transfer cylinder 108 is moved upward into the die cavity 77 by conducting air under pressure from an air source (not shown) through the extension air-hose 132, through transfer-cylinder extension air-conduit 127 and into the transfer-cylinder extension air-chamber 119. Beneath the transfer-cylinder piston 126 is a transfer-cylinder retraction air-chamber 104. The transfer cylinder 108 is retracted from the die cavity 77 by conducting air under pressure through retraction air-hose 131, through transfer-cylinder retraction air-conduit 129 and into the transfer-cylinder retraction air-chamber 104. Air is supplied alternately through the retraction air-hose 131 and through extension air-hose 132 from a valve controlled air supply in a conventional manner. For example, the air can be supplied from a conventional source of compressed air through a conventional valve whose operation is governed by the rotational position of the turret assembly 28 by way of cams.

The transfer-cylinder piston 126 is rigidly connected to a sleeve bearing 40 through inner cylinder 120. Sleeve bearing 40 is mounted for rotation about turret shaft 42, permitting the sample transfer means 26 to remain rotationally stationary although turret shaft 42 is continuously rotating. A transfer-cylinder drive pin 117 is attached to transfer cylinder 108 and extends beyond transfer cylinder 108 in a direction parallel with the axis of turret shaft 42. Adjacent to sleeve bearing 40 is cam disc 105 securely attached to turret shaft 42, by way of a set-screw, for continuous rotation with turret shaft 42. Along the outer periphery of cam disc 105 and extending toward transfer-cylinder drive pin 117 are a plurality of transfer-cylinder drive-pin cams 107, one for each sample testing unit 27.

The transfer-cylinder drive-pin cams 107 are arranged to contact the transfer-cylinder drive-pin 117 and drive the entire sample transfer means forward aligned with and at the rotational speed of the sample gripping jaws 35 and 36. As the transfer-cylinder drive-pin 117 moves forward it is pushed into the roller-arm slot 118 of roller-arm 116. The roller-arm 116 is pinned for pivotal movement about one end and on the other end has a roller 133 rotatable attached. Protruding forward from transfer-cylinder drive-pin cam 107 is a narrow roller cam 106 which is positioned to come into contact with the upper portion of the roller 133 (illustrated in FIG. 9). Upon striking the roller 133, the roller cam 106 pushes the roller 133, along with that end of the roller arm 116, downward against the biasing action of roller-arm spring 135 (illustrated in FIG. 10). The transfer-cylinder drive-pin 117, being held within the roller-arm slot 118, is pushed downward by roller-arm 116 where it slips beneath the transfer-cylinder drive-pin cam 107, releasing the forward rotational force on the sample transfer means 26 and permitting the transfer-cylinder return spring 111 to return the sample transfer means 26 back to the line extending between the axis of the turret shaft 42 and the cutting die 77.

When the transfer-cylinder drive pin 117 is forced downward by the roller-arm 116 along with the roller 133, it pulls the transfer-cylinder 108 down along with it. The sample gripping jaws 35 and 36 have already gripped the ends of the sample 30 at this time and the sample-transfer plate 79 is pulled downward from the gripped sample 30. The suction means operating through the suction air supply hose 124 releases the suction on the sample to facilitate separation of the sample transfer plate 79 from the sample 30. Because the sample transfer plate 79 is no longer in contact with the sample 30, it does not damage the sample 30 when the plate 79 is rotated back to its original position.

The sample 30 is held by the gripping jaws 35 and 36 in an alignment direction which is perpendicular to the direction of movement of the continuous length of sample material 20 passing through the cutting means 22. The motion just described for the sample transfer means 26 is completely satisfactory when the punch and die are also aligned in a direction perpendicular to the direction of movement of the continuous length of sample material 20 (illustrated as 78A in FIG. 5). However, if the elongate dimension of the punch and die is aligned in the direction of sample material 20 movement (illustrated as 78 in FIG. 5), the sample-transfer plate 79 will have its elongate dimension perpendicular to the elongate dimension of the punch and die and will not be able to enter the die cavity 77. Therefore, it is necessary to provide a turning arrangement to align the sample-transfer plate 79 with the die cavity 77 before returning it to the die cavity 77. Likewise, the turning arrangement must also be capable of turning the sample-transfer plate 79 when pulling it down from the die cavity 77 to align it with the sample-gripping jaws 35 and 36.

The means for turning the sample-transfer plate 79 include transfer-cylinder turning cam 112 and transfer-cylinder cam follower 115. The transfer-cylinder turning cam 112 is attached to the rotatable base plate 75 of the die assembly by way of the turning-cam bracket 113 so that the transfer-cylinder turning-cam 112 is rotated whenever the punch and die assembly is rotated. The transfer-cylinder cam-follower 115 is rigidly attached to transfer-cylinder 108, and, when biased against the transfer-cylinder turning-cam 112 by the cam-follower biasing-spring 114, causes the transfer-cylinder 108 and the sample transfer plate 79 to turn into alignment with the die cavity 77 when they are extended upwardly.

FIG. 11 illustrates this turning action where the position of the die cutting-edge insert 78A is illustrated in broken line as aligning with the sample-gripping jaws 35 and 36 and illustrated in broken lines with the indicating numeral 78 where it aligns perpendicularly to the sample-gripping jaws 35 and 36. In the latter case, the transfer-cylinder turning-cam 112 is positioned to contact the transfer-cylinder cam-follower 115 and cause it, along with the transfer-cylinder 108 and sample transfer plate 79 to rotate to the position shown in broken lines and indicated as 115A, carrying the sample transfer plate 79 to the position indicated 78A. In the former case, the transfer-cylinder turning-cam 112 will be in a position indicated in broken lines and indicated by the numeral 112A. In this position, the transfer-cylinder cam follower 115 will pass through its complete vertical path without contacting the transfer-cylinder turning-cam 112, and thus the sample transfer plate 79 is not turned. To assure the reverse turning action of the sample transfer plate 79 when it is retracted from the die cavity 77, the transfer-cylinder cam-follower 112 by the cam-follower biasing spring 114.

To assure that the sample transfer plate 79 is not turned further upon reaching its proper alignment, a transfer-cylinder turn stop 109 is provided to catch the transfer-cylinder drive-pin 117. The transfer-cylinder turn stop 109 is securely connected to the base of the inner cylinder 120. The transfer-cylinder turn stop 109 also prevents the sample transfer plate 79 from turning when it is being driven by the transfer-cylinder drive-pin cam 107.

Figure 12:
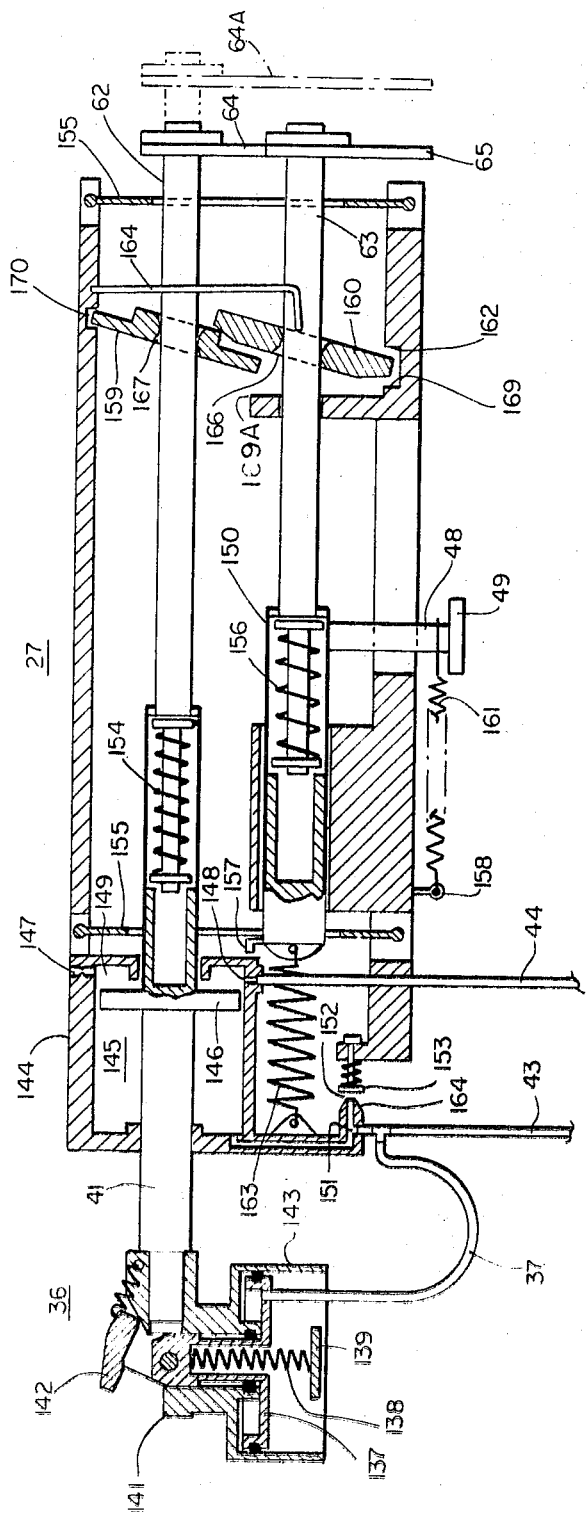
FIG. 12 is a sectional elevation view in schematic form of a sample testing unit.

Referring now to FIG. 12, the operation of each sample testing unit 27 will now be described. Each sample testing unit 27 is a complete self-contained unit. The system consists basically of a spring loaded zero force balance with pneumatic feedback. The sample 30 is gripped by the gripping jaws 35 and 36 when compressed air is supplied through air hose 43, through air hose 37 and into the chamber above the gripping Jaw piston 37. The air pressure forces the gripping jaw piston 137 downward within the gripping jaw cylinder 143, pulling the movable gripping jaw 142 shut against the fixed gripping jaw 141. Upon release of the air pressure, the closing spring 138 pushes the gripping jaw piston 137 back up into the gripping jaw cylinder 143. Sample gripping jaws 35 (illustrated in FIG. 2) grip the opposite end of the sample 30 in a similar manner.

A movable sample gripping jaw 36 is attached to piston rod 41 through which the tensile force is applied to the sample. The tensile force applied to the sample is initiated by moving cam-driven shaft 48 forward, which in turn moves the drive member 150 forward. Attached to one end of the drive member 150 is a drive spring 163. The opposite end of the drive spring 163 is connected to floating housing 144. Forward movement of the drive member 150 applies a forward force to the floating housing 144 proportional to the extension of the drive spring 163. The drive spring 163 is an isoelastic spring and therefore the force applied to the floating housing 144 by the drive spring 163 is directly proportional to the movement of the drive member 150.

Within the floating housing 144, there is a driven-piston air chamber 145 through which the piston rod 41 passes. Rigidly attached to the piston rod 41 within the drive-piston air chamber 145 is the drive piston 146. Air under pressure is conducted from a conventional compressed air supply into the drive-piston air chamber 145 through drive air conduit 151 from air hose 43. The pressurized air exerts a force against the drive piston 146, which in turn applies tensile force to the sample 30 through the piston rod 41.

On the opposite side of drive piston 146 is a drive-piston biasing air-chamber 149, also designed for containing air under pressure. Air is supplied from a conventional compressed air supply into the driven-piston biasing air-chamber 149 by way of air hose 44 through air inlet orifice 148. Air bleed orifice 147, having a smaller size than air inlet orifice 148, continuously bleed a small amount of air from the drive-piston biasing air-chamber 149 and thus maintains the air pressure within the drive-piston biasing air-chamber 149 and the resulting biasing force against the drive-piston 146 at a constant level.

At the lower end of the drive air-conduit 151 there is a nozzle 164 continuously bleeding air from the drive air conduit 151 into nozzle air gap 152. On the opposite side of the nozzle air gap 152 from the nozzle 164 is a spring-biased, air-gap backup plate 153. The supply pressure through the air hose 43 is uniform, and therefore, the spacing between the nozzle 164 and the air-gap backup plate 153 regulates the back pressure within the drive-air conduit 151, and consequently, the air pressure within the drive-piston air chamber 145.

When a forward force is applied to the floating housing 144 by the extended drive spring 163, the floating housing 144 is urged forward closing the nozzle air gap slightly. This results in an increase of the air pressure within the drive-piston air chamber 145, and consequently, an increase in tensile force applied to the sample 30. The same force applied to the drive piston 146 by the increased air pressure within the drive-piston air chamber 145 is reactionarily applied to the wall of floating housing 144 opposing the drive-piston 146, urging the floating housing 144 backward away from the drive-piston 146. This reactionary force tends to open the nozzle air gap 152, thus reducing the air pressure within the drive-piston air chamber 145. When the reactionary force on the floating housing 144 equals the forward force exerted on the floating housing 144 by the extended drive spring 163, the system is in balance and the size of the nozzle air gap 152 will remain constant until an increased force is applied to the floating housing 144 by the drive spring 163. In actual operation, the cam-driven shaft 48 is being continuously moved forward, resulting in a continuously increasing forward force on the floating housing 144. Thus, the size of the nozzle air gap 152 is constantly being adjusted to increase the air pressure within the drive-piston air chamber 145 in direct proportion to the movement of the cam-driven shaft 48.

A force-measuring rod 63 is connected to the drive member 150 on the opposite end from the drive spring 163 through a preloaded spring 156. The force-measuring rod 63 is displaced forward in direct proportion to the extension of the drive spring 163. On one end of the force-measuring rod 63 is a force-rod contact-element 65 securely attached to the force-measuring rod 63 for movement therewith. Because the drive spring 163 is an isoelastic spring, the movement of the force-rod contact-element 65 is directly proportional to the amount of force applied to the floating housing 144 by the drive spring 163. And because the tensile force applied to the sample 30 is substantially identical to the forward force applied to the floating housing 144 by the drive spring 163, the amount of movement of the force-rod contact-element 65 is directly proportional to the tensile force applied to the sample 30. Thus it can be readily appreciated that measuring the displacement of the force-rod contact-element 65 will enable determination of the amount of tensile force applied to the sample 30.

A stretch-measuring rod 62 is connected to the drive piston 146 on the side opposite the rod 41 through a pre-loaded spring 154. On one end of the stretch-measuring rod 62, a stretch-rod contact-element 64 is securely attached for movement therewith. Thus, any movement of the movable sample gripping jaw 36 causes an equal movement of the stretch-rod contact-element 64, enabling measurement of the displacement of the stretch-rod contact-element 64 to determined the amount of stretch resulting in the sample 30.

The stretch-measuring rod 62 and the force-measuring rod 63 each extend through an aperture 167 or 166 within stretch-rod grip-disc 159 and force-rod grip-disc 160, respectively. The force-rod grip-disc 160 overlaps the stretch-rod grip-disc 159 so that forward movement of the stretch-rod grip-disc 159 causes the stretch-rod grip-disc 159 to contact and apply force to one end of the force-rod grip-disc 160. In like manner, the rearward motion by force-rod grip-disc 160 causes it to contact and apply force to one end of stretch-rod grip-disc 159.

Leaf spring 164 applies a rearward biasing force to force-rod grip-disc 160, resulting in a light tilting force on both stretch-rod grip-disc 159 and force-rod grip-disc 160. The tilting of the two grip-discs 159 and 160 results in two points of the interior wall of each aperture 166 and 167 lightly pressing against the stretch-rod 62 and the force-rod 63 with a force insufficient to prevent movement of the rods through the apertures.

When the sample breaks, the forces in the system are suddenly out of balance. The floating housing 144 moves suddenly to the right, pivoting about floating housing links 155 which connect the floating housing 144 to the sample testing unit base. The stretch-rod grip-disc 159 is moved forward by clearance-free-pivot point 170 with movement of the floating housing 144. This movement of the floating housing 144 closes the nozzle gap 152, causing the drive piston 146 to move forward as well. The force-measuring rod 63 meanwhile keeps moving forward, driven at the same velocity as before the break by movement of the cam-driven shaft 48. At the moment the floating housing 144 reaches the velocity of the force-measuring rod 63, the friction forces between the force-rod grip-disc 160 and the force-measuring rod 63 change direction, causing the force-rod grip-disc 160 to lock onto the force-measuring rod 63. The stretch-rod grip-disc 159 is then prevented from moving further forward with the floating housing 144 because of the locked force-rod grip-disc 160. This causes the stretch-rod grip-disc 159 to be tilted and locked onto the stretch-measuring rod 62, preventing any further slippage of the stretch-measuring rod 62 through the stretch-rod grip-disc 159. Further movement of the drive-piston 146 at this time is absorbed by the preloaded spring 154 and does not cause movement of stretch-measuring rod 62. The continued movement of the cam-driven shaft 48 moves the whole floating system forward until the force-rod grip-disc 160 hits the force-rod grip-disc stop 162 (for cases where the sample break force was less than the preload of the preloaded spring 156). For sample break forces larger than the preload force of the preloaded spring 156, the spring 156 collapses and stop 162 is immediately reached by disc 160. The cam-driven shaft 48 continues to move further forward and the preloaded spring 156 absorbs all of this movement.

The whole system is now locked into position so that the displacement of the stretch-rod contact-element 64 and force-rod contact-element 65 can be measured at a later time. These measurements will be equatable to the tensile force applied to the sample at failure and the stretch in the sample up to failure. Any movement of the force and stretch rods in the grip-disc between breakage of the sample and locking of the grip-force onto the force and stretch rods is small enough to be insignificant. Further movement of the force and stretch rods until the force-rod grip-disc 160 is stopped by the force-rod grip-disc stop 162 is compensated for by appropriate initial scanner 61 positioning.

The cam-driven shaft 48 will eventually reach its maximum displacement and then be allowed to return to its original position by the cam-follower return-spring 161 which is rigidly attached at one end to an eye bolt 158. The whole floating system will then be returned to its starting position, and the nozzle air gap 152 will be increased, reducing the air pressure within the drive-piston air-chamber 145 and permitting the biasing air pressure within the drive-piston biasing air-chamber 149 to return the drive-piston 146 to its extreme rearward position. The force-measuring rod 63 and stretch-measuring rod 62 move back rearward with the floating housing 144 until the force-rod grip-disc 160 hits the return base stop 169 and the stretch-rod grip-disc 159 hits the base stop 169A, unlocking the discs 159 and 160 from their respective rods 62 and 63. The preloaded springs 156 and 154 will then return to their center position, resetting the rods 62 and 63 to their starting positions. The drive member 150 includes a reset knob 157 which contacts a portion of floating housing 144 and assures that it is pushed back to its starting position.

Figure 13:
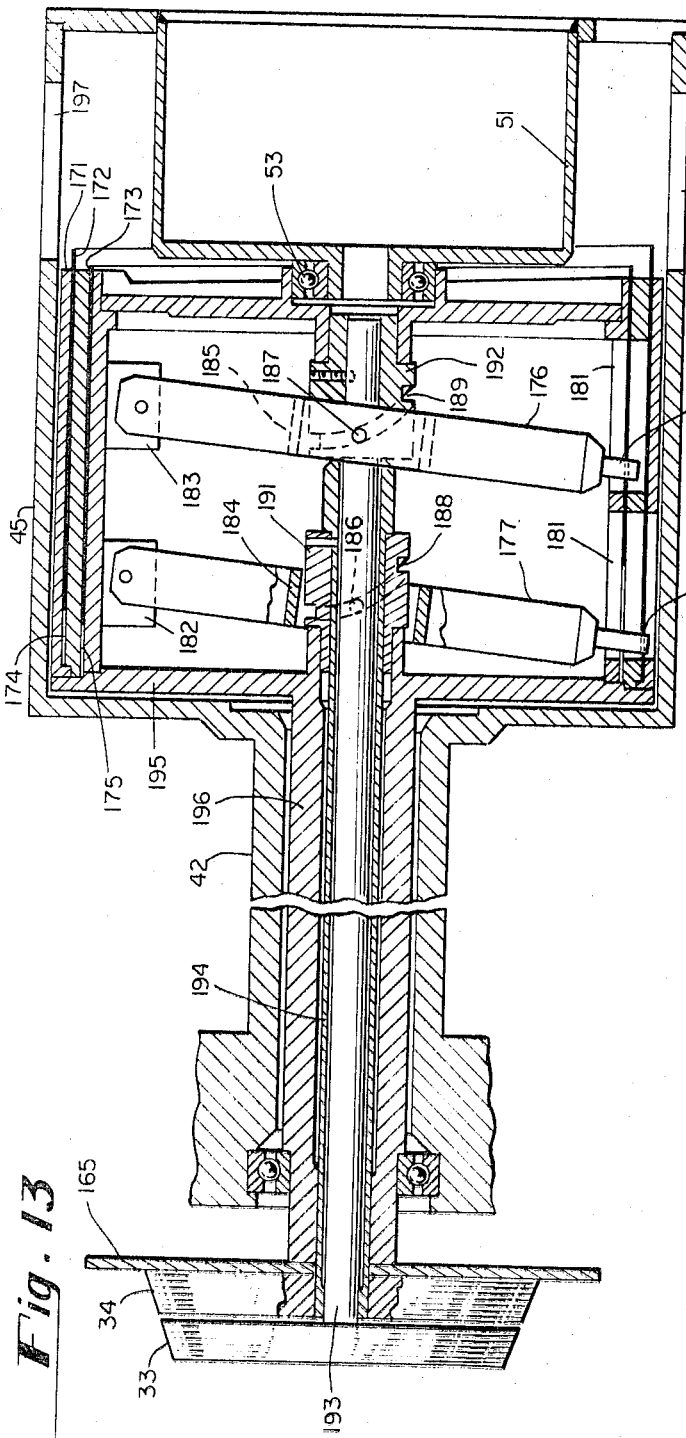
FIG. 13 is a sectional side view of the cam arrangement for providing tensile force to the sample testing unit.
Figure 14:
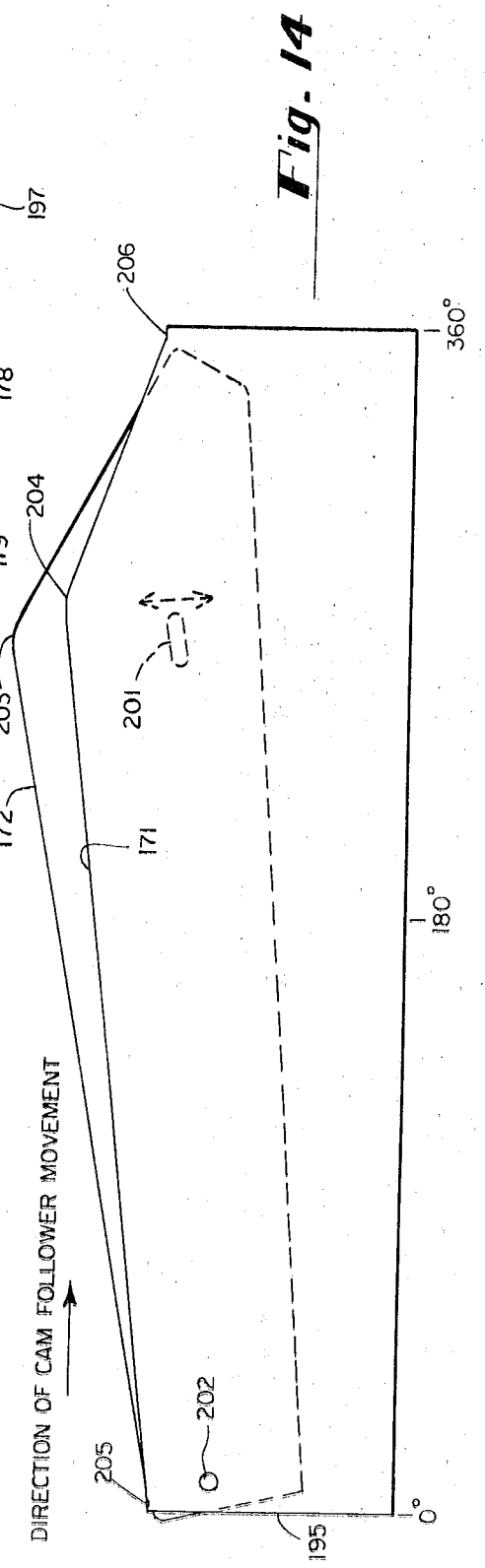
FIG. 14 is a development view extending out in a flat plane the adjustable sheet cam and fixed cam of the cam arrangement shown in FIG. 13.

The forward movement of the cam-driven shaft 48 is provided by a unique circular cam arrangement, illustrated in FIGS. 13 and 14. Referring to FIG. 13, the sample testing units 27 are attached to the outside periphery of the turret cylinder 45 and revolve with the turret cylinder 45. At spaced locations around the periphery of the turret cylinder 45 are slotted cut-outs 197 to permit cam followers 49 attached to cam-driven shaft 48 to extend into the turret cylinder 45.

Within the cylindrical enclosure of the turret cylinder 45 is a cylindrically shaped sheet cam housing 195 rigidly attached to non-rotating cam housing shaft 196. Within the outer cylindrical body of the sheet cam housing 195 are two concentric circular spaces, the inner circular space 175 and the outer circular space 174. These circular spaces contain sheet cams 173 and 172 which are movable in and out of the circular spaces. At one side of the sheet cam housing 195 there are two cam adjustment channels 181 into which extend adjustment pins 178 and 179. Each adjustment pin extends into an adjustment pin slot 201 of a separate sheet cam 172 or 173. Each adjustment pin 178 and 179 is respectively connected to the end of a sheet cam adjustment arm 176 or 177, which are each pivotally mounted on the opposite end to fixed brackets 182 and 183 of sheet cam housing 195. Pivotal movement of either adjustment arm 176 or 177 causes its respective sheet cam 172 or 173 to be extended or retracted from its circular space 174 or 175.

Movement of the outer sheet cam adjustment arm 177 is initiated by turning the load rate adjustment knob 34 to the desired posiiton. The load rate adjustment knob 34 is securely attached to the load rate adjustment shaft 196, which in turn is securely attached to helical groove cam 191. Helical groove cam 191 is enclosed by the cylindrical part 184 of the adjustment arm. Extending inwardly from the opposite side of the adjustment arm cylindrical part 184 are two adjustment arm cam follower pins 186 which engage the helical groove 188 in the helical groove cam 191. Rotation of the helical groove cam 191 causes pivotal movement of the outer sheet cam adjustment arm 177, resulting in extension or retraction of the outer sheet cam 172. Extension or retraction of the inner sheet cam 173 is caused in like manner by turning the load rate adjustment knob 33 which is rigidly connected to the load rate adjustment shaft 193 and turns the helical groove cam 192.

Where the outer circular space 174 and inner circular space 175 are open at the face of the sheet cam housing 195, the sheet cam housing 195 forms a fixed cylindrical cam surface 171. Upon complete retraction of both the inner sheet cam 173 and the outer sheet cam 172, the testing unit cam followers 49 are biased into contact with the fixed cylindrical cam 171 by the drive spring 163 and the cam-follower return-spring 161. As each sample testing unit 27 is revolved about the stationary sheet cam housing 195, the testing unit cam follower 49 is pushed forward in response to the slope of the fixed cylindrical cam 171. At a predetermined location before each sample testing unit 27 passes the readout scanner 29, the testing unit cam-follower 49 passes the crest 204 of the fixed cylindrical cam 171 and then the slope of the fixed cylindrical cam permits the testing unit cam-follower 49 to return back to its starting position (indicated in FIG. 14 with indicated numeral 206 for no-load starting position which is the same as no-load finishing positon 205). The fixed cylindrical cam surface provides means for checking overall calibration of each smaple testing unit 27 and the entire system.

For any given spring constant for drive spring 163, the amount of tensile force applied to the sample will be controlled by the displacement of the testing unit cam-follower 49 in response to following the contour of the fixed cylindrical cam 171. Where a sample requiring a greater force to break is desired to be tested, one of the sheet cams 172 or 173 can be extended from its circular space 174 or 175 to increase the displacement of the testing unit cam-follower 49. In that way, the maximum range of the testing machine can be adjusted in a matter of seconds.

Furthermore, by including cam-driven shafts 48 of different lengths on different sample testing units 27, some of the testing unit cam-followers 49 can be positioned to contact the inner sheet cam 173 while others can be positioned to contact the outer sheet cam 172. By extending the inner sheet-cam 173 further than the outer sheet-cam 172, different load ranges can be applied to different sample testing units 27. This is particularly useful where alternate samples are taken from the sample testing material 20 from the machine direction and from the cross-machine direction, each requiring a different tensile force range to break it.

The means for adjusting the sheet cams 172 and 173 are illustrated in FIG. 14 where the outer sheet-cam 172 and the fixed cylindrical-cam 171 are shown stretched out in a flat plane. The outer sheet-cam 172 is pivotably attached to the sheet-cam housing 195 through sheet-cam pivot-pin 202. Toward the other end of the sheet cam 172 is an adjustment-pin slot 201 into which adjustment pin 179 is inserted. Extension of the sheet cam 172 extends the crest 203 of sheet cam 172 further than the crest 204 of fixed cam 171, thus enabling a faster displacement rate and further displacement for the testing unit cam-follower 49.

A description of how the readout scanner operates will now be given. Referring to FIG. 2, the readout scanner 29 is stationarily mounted for rotation at one end of the turret cylinder 45 and toward the outer periphery of the turret cylinder 45. In this position, the stretch-rod contact-element 64 and force-rod contact-element 65 of each sample testing unit 27 are revolved past scanner 29 after its sample has been broken.

The scanner 29 includes an external helix 61 which extends lengthwise over a distance sufficient to cover the entire range of displacement movement of the force-rod contact-element 65 and stretch-rod contact-element 64. The scanner 61 is continuously rotated at a predetermined speed by means described earlier. The helix 61 forms an electrical contact which completes an electrical circuit upon contact with either the stretch-rod contact-element 64 or force-rod contact-element 65. A helix reference contact-element 66 is positioned close to the scanner 29 in a predetermined position. When the helix 61 contacts the helix reference contact-element 66 it also completes an electrical circuit.

Upon contact of the helix 61 with either the stretch-rod contact-element 64 or the force-rod contact-element 65, an electrical pulse generator within the scanner 29 begins transmitting pulses which are proportional to the amount of rotation of the scanner 29. The pulse transmissions are terminated upon contact of the helix 61 with the helix reference contact-element 66. Thus the number of pulses transmitted after contact with one of the elements 64 or 65 is directly proportional to the distance from that contact-element 64 or 65 to the helix reference contactelement 66. The pulse signal is transmitted to a conventional pulse counter which then converts it into a number representing the position that the contact-element 64 or 65 measures. This position, of course, is readily convertible into either the tensile force required to break the sample or the amount of stretch resulting in the sample upon failure.

The electrical circuitry (not shown) can be of any type well known in the art. For example, a circuit passing through the contact-elements, the helix, and a gate switch circuit which either opens or closes the circuit, depending upon which is desired. A particular electrical pulse generator which has been used in practicing the invention is a Digital Type RI 12/15C incremental encoder with A096 bi-directioned pulses and self-contained electronics, available through Wayne George Corp. of Newton, Massachusetts. The helix must be coupled directly to the pulser without backlash.

The contact elements 64 and 65 of each sample testing unit 27 are spaced from each other circumferentially about their path of travel so that the helix 61 is rotated through at least one full cycle between passage of each contact element. The contact elements 64 and 65 are designed to be flexible so that upon contact with the helix 61 they are flexed away from the helix. This enables the contact elements 64 and 65 to be long enough to have their path of movement pass through the path of movement of the helix 61 over a longer distance than just a point. This path overlapping must be such that the helix 61 rotates through a full revolution while each contact element is passing through this contact zone.

If the axis of rotation of the scanner 29 were positioned parallel to the axis of rotation of the turret zone 45, the helix 61 would pass through this contact zone at an angle to the direction of travel of the contact elements passing through this contact zone. This would require an unobtainable high degree of spacing, alignment, and gearing accuracy between sample testing units, readout contacts and turret to scanner gearing. Otherwise, an intolerable measurement error would be inherent in the system. To avoid this inherent error, the axis of rotation of the scanner 29 is tilted. The amount and direction of tilt is such that the slope of the helix over the distance of the contact zone is parallel to the path of the contact elements passing through the contact zone. The result is that over the contacting region, the slope of the helix 61 will be perpendicular to the axis of the turret 45 when contacting the contact elements 64 or 65, regardless of where in the contact zone the contact is made. In FIG. 2, this contact zone is illustrated by the letters C.Z. showing the slope of the helix parallel over the distance of the contact zone to the path of travel of the revolving contact elements 64 and 65.

The preferred embodiment of the invention has been described as a tensile testing apparatus for testing paper. However, it will be recognized that the apparatus can be used to test other products as well. Furthermore, it will be recognized that many aspects of the invention are suitable for performing tests other than tensile. For example, the sample testing units could be adpated to perform compressive or flexure tests andd still use many features of the inventions. The invention could also be adpated to test samples to failure, when failure is defined as something other than breaking of the samples, a certain yield point for example. It is also to be recognized that the sample material does not have to be in sheet form to utilize many aspects of the invention, although the cutting means are particularly adapted to cutting samples from sheet material.

I claim:

1. Apparatus for continuously testing successive samples of material, the apparatus comprising:

a rotatable turret assembly;

means for rotating the turret assembly;

a pluraity of testing units mounted on the turret assembly for revolving therewith;

means for transferring a sample to each testing unit as it revolves past a transfer zone;

gripping means in each testing unit for gripping two opposing ends of the sample transfered to the testing units;

means for applying a gradually increasing tensile force through the gripping means to each sample until the sample fails;

force measuring means in each testing unit for measuring the amount of tensile force applied to each sample;

sensing means disposed stationarily in the path of revolution of the testing units for sensing the measured tensile force on each force measuring means as each testing unit revolves past a sensing zone; and signal means operably connected to the sensing means for producing a transmittable signal quantitatively proportional to the sensed tensile force.

2. Apparatus as recited in claim 1 wherein the gradually increasing tensile force causes the sample to stretch, and the apparatus further includes,
stretch measuring means in each testing unit for measuring the amount of stretch resulting in each sample, the stretch measuring means being capable of being sensed with the sensing means as the stretch measuring means revolves past the sensing zone, and the signal means being capable of producing a transmittable signal quantitatively proportional to the sensed stretch.

3. Apparatus as recited in claim 2, wherein the material to be tested is in sheet form, and the apparatus further includes:
cutting means for intermittently cutting samples from a length of the material, from which each sample cut is transferred to a testing unit by the transferring means; and
means for intermittently feeding the length of material into the cutting means.

4. Apparatus as recited in claim 3, wherein the cutting means cuts elongate samples from the material, and the apparatus further includes means for rotating the cutting means to vary the direction on the length of material in which the elongate dimension of each sample is cut, whereby the material can be tensile tested in more than one direction.

5. Apparatus as recited in claim 4, wherein the material is a planar paper product, and the means for applying an increasing tensile force through the gripping means to each sample includes means for applying tensile force at a predetermined increasing rate and means for automatically varying the predetermined increasing rate for the different samples taken at different directions on the length of the material.

6. Apparatus as recited in claim 2, wherein the gripping means includes a first jaw which is held against movement in one direction and a second jaw which is movable in the one direction in response to stretch of the sample, and the stretch measuring means includes a stretch measuring element connected to the second jaw for movement therewith.

7. Apparatus as recited in claim 1, wherein the amount of tensile force applied to each sample is measured with the force measuring means by extending an element a distance from a reference point which is proportional to the tensile force applied to the sample, the element positioned to pass thorugh a reference line in the sensing zone when its respective testing unit revolves past the sensing zone, and the sensing means and signal means include:
a helix disposed to have a varying part of its outer surface pass through the reference line when the helix rotates to vary the location on the reference line where the helix passes through the reference line in linear proportion to the amount of rotation of the helix;
means for rotating the helix;
means for creating an electrical signal quantitatively proportional to the amount of rotation of the helix;

means for creating an electrical circuit through each element and the helix when they contact each other;
first switch means within the electrical circuits performing the function of either starting or stopping the electrical signal when contact is made between the helix and each element; and
second switch means for performing the opposite function of the first switch means on the electrical signal when the helix passes through the line at the reference point, whereby each electrical signal is quantitatively proportional to the distance along the line between the reference point and the element being scanned.

8. Apparatus as recited in claim 1, wherein the means for applying a gradually increasing tensile force includes and isoelastic spring in each testing unit and means for applying a linear motion to a first end of the spring, whereby an increasing tensile force is applied to the sample through the other end of the spring, and
the force measuring means in each testing unit includes a force measuring element connected to the first end of the spring in its respective testing unit, whereby the force measuring element is extended to the same extent the first end of the spring is extended by the linear motion.

9. Method of continuously tensile testing successive samples of material, the method comprising:
continuously revolving testing units mounted on a turret assembly in a path which passes through a sample-transfer zone and a tensile-force-sensing zone with a plurality of the testing units passing concurrently from the transfer zone to the sensing zone;
transferring a sample to each testing unit as it revolves through the transfer zone;
gripping two opposing ends of the sample transferred to each testing unit with a pair of gripping jaws in each testing unit;
applying a gradually increasing tensile force through the gripping jaws to each sample until the sample fails, the tensile force being applied concurrently to a plurality of samples while their respective testing units are passing from the transfer zone to the sensing zone;
measuring the amount of tensile force applied to each sample with a force measuring element in each testing unit;
sensing with a single stationary scanner located in the sensing zone the measured tensile force on each force measuring element as the element revolves through the sensing zone; and
producing a transmittable signal quantitatively proportional to the sensed force measurement.

10. Method as recited in claim 9, wherein the gradually increasing tensile force results in an increase in stretch in the sample, and the method further includes the steps of:
measuring the amount of stretch resulting in each sample on a stretch measuring element in each testing unit;
sensing with a single stationary scanner the measured stretch on the stretch measuring element as the element revolves through the sensing zone; and
producing a transmittable signal quantitatively proportional to the sensed stretch measurement.

11. Method as recited in claim 10 wherein the material to be tested is a sheet material, and including the steps of:
intermittently feeding a continuous length of the material into a cutting station; and intermittently cutting samples from the length of the material at the cutting station, from which each cut sample is transferred to a testing unit.

12. Method as recited in claim 11, wherein the material is a planar paper product having different strength and stretch properties in different directions in the plane of the product, and including the steps of:
cutting elongate samples from the material; and
varying the direction in the plane of the material in which successive elongate dimension of each sample is cut, whereby the material can be tensile tested in more than one direction.

13. Method as recited in claim 12, wherein the tensile force is applied to successive samples at alternating different predetermined increasing rates.

14. Method as recited in claim 10, wherein each pair of gripping jaws includes a first jaw which is held against movement in one direction and a second jaw which is movable in the one direction in response to stretch of the sample, and the stretch measuring element is connected to the second jaw for movement therewith, and the method further includes the step of, extending the stretch measuring element with respect to a reference point to the same extent the second gripping jaw is extended in response to the stretch of the sample.

15. Method as recited in claim 9, wherein the amount of tensile force applied to each sample is measured with a force measuring element by extending the element a distance from a reference point which is proportional to the tensile force applied to the sample, the element is positioned to pass through a reference line in the sensing zone, and the steps of sensing the measured tensile force and producing a transmittable signal include:
rotating a helix disposed to have a varying part of its outer surface pass through the reference line when the helix rotates to vary the location on the reference line where the helix passes through the reference line in linear proportion to the amount of rotation of the helix;
creating an electrical signal quantitatively proportional to the amount of rotation of the helix;
performing the first function of either starting or stopping the electrical signal when the helix contacts the element; and
performing the opposite function of the first function to the electrical signal when the helix passes through the line at the reference point, whereby each electrical signal is quantatively proportional to the distance along the line between the reference point and the element.

16. Method as recited in claim 9, wherein the tensile force is applied to each sample through an iso-elastic spring in each unit and the force measuring element is connected to a first end of the spring, and the method further includes the step of:
applying a linear motion to the first end of the spring, whereby an increasing force is applied to the sample through the other end of the spring; and
extending the force measuring element with respect to a reference point to the same extent the first end of the spring is extended by the linear motion.

17. Apparatus for tensile testing a sample of material, the apparatus having at least one testing unit comprising:

first gripping means for holding one end of the sample against movement in a first direction;
second gripping means for holding the opposite end of the sample, the second gripping means being capable of movement in the first direction;
a piston which is movable in the first direction connected to a second gripping means;
a cylinder in which the piston is movably disposed to form one wall of a variable size chamber within the cylinder;
a first member;
means for applying a predetermined linear motion to the first member;
a second member;
operative connecting means between the first member and the second member for converting the predetermined linear motion applied to the first member to a predetermined increasing force applied to the second member; and
means for converting the predetermined increasing force applied to the second member to a corresponding increase in fluid pressure in the chamber, whereby a predetermined increasing tensile force is applied to the sample by the gripping means.

18. Apparatus as recited in claim 17, wherein the operative connecting means is an iso-elastic spring attached at one end to the first member and at the opposite end to the second member.

19. Apparatus as recited in claim 18, including a floating housing which includes the cylinder as a part thereof and moves in response to the force applied by the iso-elastic spring to the second member.

20. Apparatus as recited in claim 19, including:
a nozzle connected for movement with the floating housing toward or away from a surface to form a gap between the nozzle and the surface;
fluid means for providing fluid at constant pressure; and
a fluid conduit for conducting the fluid from the fluid means to the chamber and to the nozzle where it passes into the gap, whereby fluid can be discharged into the gap to produce a back pressure in the nozzle which is governed by the size of the gap, and the back pressure produced in the nozzle is transmitted through the conduit to the chamber to produce a fluid pressure within the chamber which is governed by the size of the gap.

21. Apparatus as recited in claim 20, further including:
a stretch measuring rod connected to the piston for movement therewith into an extended position;
a force measuring rod connected to the first member for movement therewith into an extended position;

means for locking the stretch rod in the extended position reached at the time of sample failure; and
means for locking the force rod in the extended position reached at the time of sample failure.

22. Apparatus as recited in claim 20, wherein the means for locking the stretch rod are provided by;
a first grip disc having an aperture through which the stretch rod passes;
means for pivoting the first grip disc about one end to lock the stretch rod to the first grip disc; and
means for holding the first grip disc;
and the means for locking the force rod are provided by:

a second grip disc having an aperture through which the force rod passes;

means for pivoting the second grip disc about one end to lock the second grip disc to the force rod; and means for holding the second grip disc.

23. Apparatus as recited in claim 22, wherein the means for pivoting the first grip disc and the means for pivoting the second grip disc include means responsive to the movement of the floating housing reacting to the failure of the sample.

24. Apparatus as recited in claim 23, further including a first spring operatively connecting the stretch rod to the piston, and a second spring operatively connecting the force rod to the first member, whereby movement of the first member and piston can continue after the stretch rod and force rod are locked.

25. Apparatus as recited in claim 2, further including:

a turret assembly having a plurality of the testing units mounted thereon for revolving in a circular path;

a stationary cam surface disposed in a circle coaxial with the axis of the turret assembly;

a cam follower connected to the first member of each testing unit;

biasing means for maintaining each cam follower in contact with the cam surface while its respective testing unit revolves with the turret assembly; and means for continuously rotating the turret assembly at a predetermined speed, whereby the first member is moved in a predetermined velocity linear motion.

26. Apparatus as recited in claim 25, including stationary sensing means positioned to sense the amount of extension of the stretch rod and the amount of extension of the force rod while each testing unit revolves past the sensing means.

27. Apparatus as recited in claim 26, including means for automatically transferring samples to the gripping means of each testing unit while the testing unit continuously revolves past the sample transfer means.

28. Apparatus as recited in claim 17, including a stretch measuring rod connected to the piston for movement therewith, whereby the stretch rod is extended with respect to a reference point in proportion to the amount of stretch resulting in the samples from the applied tensile force.

29. Apparatus as recited in claim 28, including means for locking the stretch rod in the extended position reached at the time of sample failure, whereby the amount of stretch in the sample at failure can be sensed at a time after the sample has failed.

30. Apparatus as recited in claim 29, wherein the means for locking the stretch rod are provided by:

a grip disc having an aperture through which the stretch rod passes;

means for pivoting the grip disc about one end, whereby two points of the interior wall of the aperture are pressed against the stretch rod to prevent movement of the rod through the aperture of the grip disc; and means for holding the grip disc against movement with respect to the reference point.

31. Apparatus as recited in claim 17, including a force meausring rod connected to the first member for movement therewith, whereby the force rod is extended with respect to a reference point in proportion to the amount of tensile force applied to the sample.

32. The apparatus as recited in claim 31, including means for locking the force rod in the extended position reached at the time of sample failure, whereby the amount of tensile force required to fail the sample can be sensed at a time after the sample has failed.

33. Apparatus as recited in claim 32, wherein the means for locking the force rod are provided by:

a grip disc having an aperture through which the force rod passes;

means for pivoting the grip disc about one end, whereby two points of the interior wall of the aperture are pressed against the force rod to prevent movement of the rod through the aperture of the grip disc; and means for holding the grip disc against movement with respect to the reference point.

34. Apparatus as recited in claim 17, further including:

a turret assembly having a plurality of the testing units mounted thereon for revolving in a circular path;

a first stationary cam surface disposed in a circle coaxial with the axis of the turret assembly;

a cam follower connected to the first member of each testing unit;

biasing means for maintaining each cam follower in contact with the first cam surface while its respective testing unit revolves with the turret assembly; and means for continuously rotating the turret assembly at a predetermined speed, whereby the first member is moved in a predetermined velocity linear motion.

35. Apparatus recited in claim 34, wherein the cam surface is provide by an adjustable-slope sheet cam, and the apparatus further includes means for adjusting the slope of the sheet cam surface to control the movement of the first member in response to the cam surface, whereby the increase of tensile force applied to the sample is controlled.

36. Apparatus as recited in claim 34, including a second stationary cam surface concentric to the first cam surface, the cam follower of at least one of the plurality of testing units being positioned to maintain operative contact with the first cam surface to apply one linear motion to that cam follower, and the cam follower of at least one of the other testing units being positioned to maintain operative contact with the second cam surface to provide a second linear motion to that other cam follower.

37. Apparatus for continuously testing successive samples of material, the apparatus comprising:

a rotatable turret assembly;

means for rotating the turret assembly;

a plurality of testing units mounted on the turret assembly for revolving therewith;

means for transferring a sample to each testing unit as it revolves past the transfer zone;

means for applying a force to each sample in the testing units;

force measuring means in each testing unit for measuring the amount of force applied to each sample; and sensing means disposed in the path of revolution of the testing units for sensing the measured force on each force measuring means as each testing unit revolves past a sensing zone.

38. Apparatus as recited in claim 37, wherein each testing unit includes gripping means for gripping two opposing ends of the sample transferred to the testing units, and the means for applying a force to each sample is provided by means for applying a gradually increasing tensile force through the gripping means to each sample until the sample fails.

* * * * *

UNITED STATES PATENT OFFICE
CERTIFICATE OF CORRECTION

PO-1050 (5/69)

Patent No. 3,838,596　　　　Dated October 1, 1974

Inventor(s)　Rudolph Neuenschwander

It is certified that error appears in the above-identified patent and that said Letters Patent are hereby corrected as shown below:

Column 4, line 40, delete the sentence beginning on line 41 "The ability to apply different tensile forces will be different Column 6, line 45, change "menas" to --means--

Column 7, line 60, after the numeral "5" insert a comma --,--

Column 8, line 49, change "crossmachine" to --cross-machine--

Column 12, line 49, change "driven" to --drive--

Column 12, line 62, change "driven" to --drive--

Column 12, line 66, change "bleed" to --bleeds--

Column 13, line 49, change "isoelastic" to --iso-elastic--

Column 15, line 2, change "grip-force" to --grip-discs--

Column 16, line 33, change "smaple" to --sample--

Column 17, line 34, change "contactelement" to --contact-element--

Column 18, line 32, change "andd" to --and--

Column 18, line 34, change "when" to --where--

Column 18, line 47, change "plurlaity" to --plurality--

PO-1050
(5/69)

UNITED STATES PATENT OFFICE
CERTIFICATE OF CORRECTION

Patent No. 3,838,596      Dated October 1, 1974

Inventor(s) Rudolph Neuenschwander

It is certified that error appears in the above-identified patent and that said Letters Patent are hereby corrected as shown below:

Column 19, line 49, change "thorugh" to --through--

Column 20, line 12, change "and" to --an--; change "isoelastic" to --iso-elastic--

Column 22, claim 22, change "claim 20" to --claim 21--

Column 23, line 18, change "claim 2" to --claim 21--

Column 23, line 68, change "meausring" to --measuring--

Signed and Sealed this

Thirtieth Day of November 1976

[SEAL]

Attest:

RUTH C. MASON
Attesting Officer

C. MARSHALL DANN
Commissioner of Patents and Trademarks